Y. SHIMIZU.
TIRE CHAIN FASTENER.
APPLICATION FILED JULY 16, 1918.
1,336,383. Patented Apr. 6, 1920.
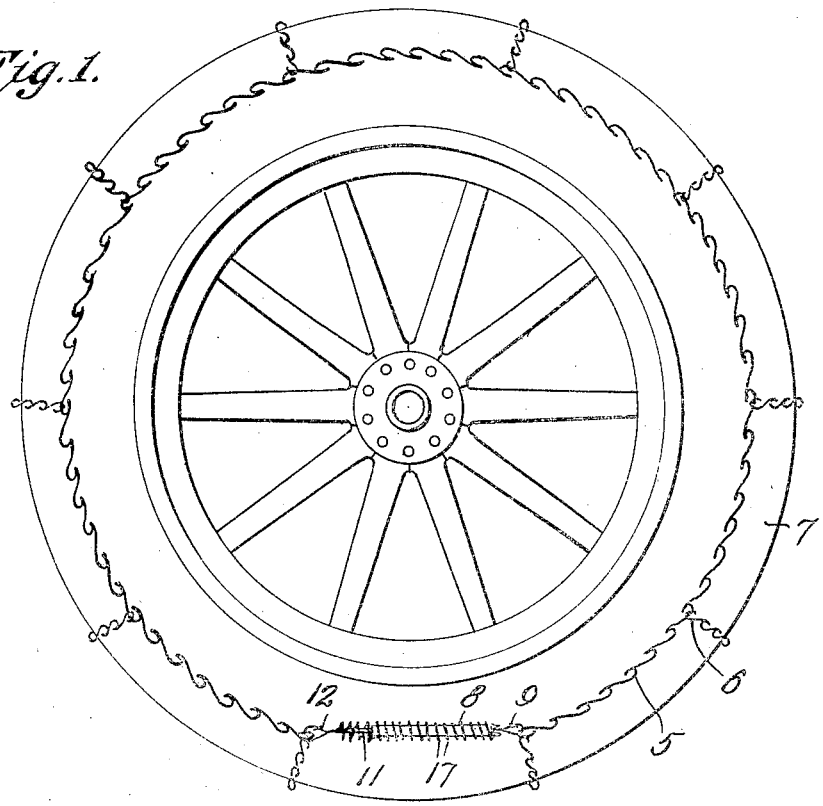
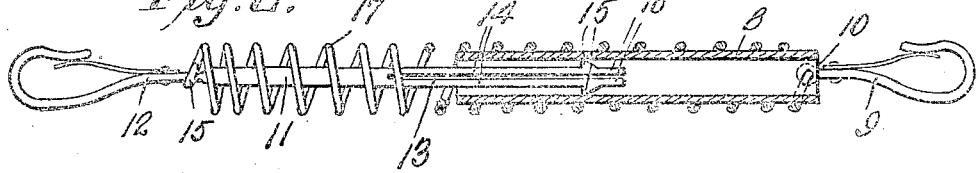
Inventor
Yoshi Shimizu,

UNITED STATES PATENT OFFICE.

YOSHI SHIMIZU, OF NEW YORK, N. Y.

TIRE-CHAIN FASTENER.

1,336,383.  Specification of Letters Patent.  Patented Apr. 6, 1920.

Application filed July 16, 1918. Serial No. 245,193.

*To all whom it may concern:*

Be it known that I, YOSHI SHIMIZU, a subject of the Mikado of Japan, residing at New York, in the county of New York and State of New York, have invented certain new and useful Improvements in Tire-Chain Fasteners, of which the following is a specification.

This invention is a tire chain connector and has for its principal object the production of efficient means for releasably connecting the side chains in an operative position to prevent the accidental displacement of the anti-skid device.

Another object of this invention is the production of a tire chain connector which is constructed so as to expand for allowing an anti-skid device to be slipped onto a tire, although after the tire begins to rotate the resiliency of the connector will cause the same to move to a locked position, thus holding the chains against accidental displacement.

Another object of this invention is the production of a tire chain connector wherein latching means is associated with a resilient spring, thus allowing the ends of the chain to be resiliently connected together, although after a time, the latching mechanism will operate for relieving the strain from the spring, whereby the chain will be releasably held against movement.

Broadly stated, the invention consists of a tube, a stem provided with resilient fingers, extending into the tube, heads formed on said fingers and provided with riveted extensions thereon, a resilient spring connected to said stem and said tube, and snap hooks connected to said tube and said stem.

One practical form of construction and assembly of the present invention will be hereinafter described and is illustrated in the accompanying drawing, in which—

Figure 1 is a side elevation of the tire chain connector in use.

Fig. 2 is a central longitudinal section through the tube and a portion of the spring, the remaining elements being shown in elevation, and Fig. 3 is a view similar to Fig. 2 showing the latching mechanism in an engaged condition.

In the preferred embodiment of the present invention, about to be described, it will be seen that the tire chain connector is used in combination with the side chain 5 of an anti-skid device 6 carried upon a tire tread. It is therefore obvious that a connector as illustrated in Figs. 2 and 3 is used upon each side of the tire. Therefore, it is obvious that any other form of yieldable anti-skid construction may be employed, since the novelty of the invention resides in the means for connecting the side chains.

The cylindrical tube 8 is incorporated in the construction of the latching means, as shown in Figs. 2 and 3. Although this tube is designated as cylindrical, it is obvious that it may be of any desired shape in cross section, without departing from the spirit of the present invention, as long as the same is elongated and is hollow.

The snap hook 9 which may be of any desired construction is pivotally mounted as indicated at 10 upon one end of the tube 8. It will be understood, by referring to Figs. 2 and 3 that the ends of the tube 8 are unobstructed.

An elongated stem 11 has a snap hook 12 formed on its outer end, although the opposite end portion of the stem 11 is bifurcated as indicated at 13, thus forming resilient fingers 14. Substantially triangular lugs 15 are formed on the fingers 14 adjacent their outer extremities, although it will be noted that gripping extensions 16 project beyond the lugs 15.

The lugs extend outwardly in an opposite direction with respect to each other, although it will be noted that the inner surfaces of the fingers 14 are unobstructed throughout their entire lengths. The stem, as well as the fingers thereof extend into the tube, as illustrated in Fig. 3.

In order to hold the stem against displacement however, there is provided a coiled spring 17. One end of the coiled spring 17 is reduced as indicated at 18 to grip the stem 11 adjacent the junction of the snap hook 12. The opposite end of this coiled spring 17 is secured to the tube in any desired manner at the pivot 10 of the snap hook 9.

With this construction it will be seen that the coiled spring will not only hold the stem against accidental displacement but will tend to urge the stem into the interior of the tube 8 under all conditions.

When the present invention is in use, it is assembled as hereinbefore described, at which time, the snap hooks 9 and 12 will be in engagement with the ends of the side chain 5, it being noted that in a complete device two of the latching structures hereinbefore described will be used upon each tire and chain structure, as a latching device will be carried upon each side of the tire.

In order to apply the anti skid device to a tire, it is obvious the spring 17 may be expanded by opposite pulls upon the snap hooks 9 and 12, thus permitting the anti-skid device to be placed upon the tire. After the side chains 5 have assumed their normal positions, it is obvious the resiliency of the coiled springs of each latching device will tend to return the stem 7 into the tube. It will be understood that when the side chains are being placed in their correct positions, the coiled spring of the latching device will be expanded to allow the device to assume the position indicated in general in Fig. 2.

After the device has been positioned upon said tire, it is obvious the wheel may be rotated in the usual manner. After the beginning of the rotation, the tension of the coiled spring will tend to return the stem into the tube and in a short time, the side chain will be drawn taut. Therefore, the spring will return to its normal position and will cause the lugs 15 to pass out of the tube, as shown in Fig. 3. Owing to the resiliency of the fingers 14 and the triangular shape of the lugs 15, these lugs will engage the end of the tube, as shown in Fig. 3 and prevent a counter-movement of the stem. Therefore, the hooks 9 and 12 will firmly hold the chain taut, as at this time, the engagement between the stem and tube will be fixed, relieving strain from the coiled spring 17. When, however, it is desired to remove the device from the tire, the extensions 16 which are at this time extending beyond the tube 17, as shown in Fig. 3, may be gripped and urged toward each other, thus causing the resilient fingers 14 to move toward each other and allow the lugs 15 to disengage the end of the tube 8. Therefore, the snap hooks 12 and 9 may be again moved away from each other by the expanding of the coiled spring 17 and the moving of the stem from the interior of the tube 8, as shown in Fig. 2.

From the foregoing description it will be seen that a very simple and efficient connection has been provided for the side chains of an anti-skid device, which is of a resilient construction for urging the ends of the chain toward each other, thus causing the chain to become taut. The operation of the device is automatic, for the resiliency of the spring will cause the lugs of the fingers to engage the end of the tube automatically for latching the ends of the chain against accidental movement and thus firmly hold the same against yielding, since the retaining strain is at this time removed from the coiled spring.

When, however, it is desired to remove the anti-skid device it is obvious the resilient fingers may be compressed, thus permitting the stem to move from the tube and against the tension of the coiled spring and allowing the stem to move apart, thus permitting the side chain to be slipped from engagement with the tire.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A tire chain fastener including a tube, a stem having resilient fingers provided with lugs, gripping extensions projecting beyond the lugs, connecting means carried by said tube and said stem, whereby the stem and fingers may be moved into the tube, thus causing the lug to engage one end of the tube for holding said stem and tube against accidental movement, whereby the same will be held in a taut condition, although said extensions may be gripped and urged toward each other to release the lugs from a set engagement with the tube when desired.

2. A tire chain fastener comprising a tube, a stem having resilient fingers extending into said tube, lugs formed upon said fingers, gripping extensions projecting beyond said lugs, a coiled spring connected to said tube and said stem, connecting means carried by said tube and said stem for engaging the ends of the chain, whereby said spring will urge said stem into the tube to tension the chain, until said lugs engage one end of the tube, thus latching the stem in engagement with the tube and preventing of accidental separation of the ends of the chain, although said extensions may be gripped and urged together for releasing the lugs from a latched engagement with the tube when it is desired to remove the anti-skid device.

In testimony whereof I affix my signature.

YOSHI SHIMIZU.